US008967318B2

(12) United States Patent
Kuwabara et al.

(10) Patent No.: US 8,967,318 B2
(45) Date of Patent: Mar. 3, 2015

(54) ALL-TERRAIN VEHICLE

(75) Inventors: Naoki Kuwabara, Wako (JP); Bunzo Seki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/635,990

(22) PCT Filed: Mar. 16, 2011

(86) PCT No.: PCT/JP2011/056180
§ 371 (c)(1),
(2), (4) Date: Sep. 19, 2012

(87) PCT Pub. No.: WO2011/118465
PCT Pub. Date: Sep. 29, 2011

(65) Prior Publication Data
US 2013/0008736 A1    Jan. 10, 2013

(30) Foreign Application Priority Data

Mar. 25, 2010   (JP) ................................. 2010-070822

(51) Int. Cl.
*B60G 3/14*     (2006.01)
*B60G 7/00*     (2006.01)
(Continued)

(52) U.S. Cl.
CPC  *B60G 3/14* (2013.01); *B60G 7/008* (2013.01); *B60G 2200/142* (2013.01);
(Continued)

(58) Field of Classification Search
CPC .......... B62D 21/11; B60G 3/14; B60G 7/008; B60G 2200/142; B60G 2200/129; B60G 2200/44; B60G 2200/46; B60G 2204/148; B60G 2206/50; B60G 2300/124; B60G 15/068; B60K 17/303; B60K 17/306; B60K 5/01; B60K 17/22; B60B 35/127; B60B 35/128
USPC ............ 180/291, 312, 377, 378; 280/124.156
See application file for complete search history.

(56) References Cited

U.S. PATENT DOCUMENTS 2,660,449 A * 11/1953 MacPherson .......... 280/124.149
4,735,275 A *  4/1988 Tsukahara et al. ............ 180/215
(Continued)

FOREIGN PATENT DOCUMENTS

JP      62-83283 A      4/1987
JP   2003-127629 A      5/2003
(Continued)

OTHER PUBLICATIONS

International Search Report dated Apr. 26, 2011 corresponding to International Patent Application No. PCT/JP2011/056180 and English Translation thereof.
(Continued)

*Primary Examiner* — J. Allen Shriver, II
*Assistant Examiner* — Steve Clemmons
(74) *Attorney, Agent, or Firm* — Squire Patton Boggs (US) LLP

(57) ABSTRACT

An all-terrain vehicle (10) includes a vehicle body frame (11), a drive shaft (23) in the form of a constant velocity ball joint, and a lower arm (33) extending laterally of the vehicle. The drive shaft extends substantially parallel with the lower arm and includes an intermediate shaft (101) and a bearing portion (102) mounted to a vehicle-body-side end of the intermediate shaft. The bearing portion (102) is disposed to be positioned substantially on a vertical line passing over a vehicle-body-side connection portion (33*a*) of the lower arm.

1 Claim, 9 Drawing Sheets

(51) Int. Cl.
   *B62K 5/01* (2013.01)
   *B60K 17/30* (2006.01)
   *B62K 5/00* (2013.01)
   *B60K 5/02* (2006.01)
   *B60K 17/22* (2006.01)

(52) U.S. Cl.
   CPC ...... *B60G 2200/44* (2013.01); *B60G 2204/148* (2013.01); *B60G 2300/124* (2013.01); *B62K 5/01* (2013.01); *B62K 2005/001* (2013.01); *B60K 5/02* (2013.01); *B60K 17/22* (2013.01); *B60K 17/303* (2013.01)
   USPC ........ 180/291; 180/377; 180/312; 280/124.1; 280/124.155; 280/124.156

(56) References Cited

U.S. PATENT DOCUMENTS

| | | | | |
|---|---|---|---|---|
| 4,802,688 | A * | 2/1989 | Murakami et al. | 280/124.138 |
| 5,593,001 | A * | 1/1997 | Takano et al. | 180/312 |
| 5,870,809 | A * | 2/1999 | Nishi | 29/281.5 |
| 5,938,219 | A * | 8/1999 | Hayami et al. | 280/124.135 |
| 6,799,781 | B2 * | 10/2004 | Rasidescu et al. | 280/781 |
| 7,610,132 | B2 * | 10/2009 | Yanai et al. | 701/41 |
| 7,628,415 | B2 * | 12/2009 | Kitamura et al. | 280/124.154 |
| 7,658,411 | B2 * | 2/2010 | Davis et al. | 280/783 |
| 7,661,687 | B2 * | 2/2010 | Seki et al. | 280/124.135 |
| 2003/0234504 | A1 * | 12/2003 | Frantzen | 280/93.512 |
| 2004/0021286 | A1 * | 2/2004 | Bombardier et al. | 280/124.134 |
| 2006/0006623 | A1 * | 1/2006 | Leclair | 280/93.512 |
| 2006/0186699 | A1 | 8/2006 | Davis et al. | |
| 2007/0199761 | A1 * | 8/2007 | Seki | 180/312 |
| 2007/0199776 | A1 * | 8/2007 | Seki et al. | 188/73.1 |
| 2007/0257479 | A1 * | 11/2007 | Davis et al. | 280/783 |
| 2008/0023249 | A1 * | 1/2008 | Sunsdahl et al. | 180/312 |
| 2008/0217081 | A1 * | 9/2008 | Maltais et al. | 180/89.1 |

FOREIGN PATENT DOCUMENTS

| | | |
|---|---|---|
| JP | 2005-280619 A | 10/2005 |
| JP | 2005-337300 A | 12/2005 |
| JP | 2007-504999 A | 3/2007 |
| JP | 2008302813 A * | 12/2008 |
| WO | 2005/023569 A1 | 3/2005 |

OTHER PUBLICATIONS

Japanese Office Action application No. P2010-070822 dated Oct. 8, 2013.

\* cited by examiner (a) INVENTIVE EMBODIMENT (b) COMPARATIVE EXAMPLE

ALL-TERRAIN VEHICLE

TECHNICAL FIELD

The present invention relates to a technique for providing an improved all-terrain vehicle.

BACKGROUND ART

Being designed to run on on a rough terrain such as a wilderness, an all-terrain vehicle has a wheel suspension device with a cushion whose stroke is set to be strong. Since the stroke is strong, an angle of vertical swing of a constant velocity ball joint transmitting power to wheels becomes large. For this reason, there have been proposed constant velocity ball joints with arrangements made to allow the joints to be applied to all-terrain vehicles (see, for example, Patent Literature 1, FIGS. 4 and 5).

The all-terrain vehicle disclosed in Patent Literature 1 includes a differential gear and front wheels connected by a drive shaft.

A drive shaft of the disclosed vehicle includes a sliding type constant velocity universal joint provided on a differential gear side (inboard side). In the sliding type constant velocity universal joint, a bearing portion is housed within a cup. Also, the bearing portion is housed to be movable in an axial direction along a groove in the cup and be capable of oscillating within the cup.

A fixed type constant velocity universal joint is allowed to move in directions perpendicular to and along an axis of the drive shaft relative to the sliding type constant velocity universal joint.

The length of the groove is determined according to an required amount of movement in the axial direction. As the amount of movement increases, it is required to increase the size of the cup on the inboard side, thereby making the drive shaft expensive.

Since it is required to reduce the cost of an all-terrain vehicle, it is necessary to reduce the cost of a drive shaft.

PRIOR ART LITERATURE

Patent Document

Patent Document 1: JP 2005-337300 A

SUMMARY OF INVENTION

Technical Problem

It is an object of the present invention to provide an all-terrain vehicle capable of allowing an inexpensive drive shaft to be mounted therein.

Solution to Problem

According to the invention defined in claim 1, there is provided an all-terrain vehicle which comprises: a vehicle body frame; a power generating engine, mounted on the vehicle body frame, for generating power; a power transmission device for transmitting an output generated by the power generating engine; a final reduction gear, mounted on the vehicle body frame, for decelerating the power transmitted by the power transmission device; a drive shaft, extending in a direction of width of the vehicle, for transmitting the power from the final reduction gear to a wheel; a strut damper having an upper end connected to the vehicle body frame and extending downward; a knuckle supporting member extending downward from a lower part of the strut damper; a lower arm extending in the direction of width of the vehicle and connecting a lower part of the knuckle supporting member to the vehicle body frame; and a knuckle, mounted on the knuckle supporting member in such a manner as to be rotatable around a kingpin axis, for supporting the front wheel, wherein the drive shaft comprises a constant velocity ball joint extending substantially parallel with the lower arm and including: an intermediate shaft; a bearing portion mounted on a vehicle-body-side end portion of the intermediate shaft; a vehicle-body-side cup housing the bearing portion oscillatably; a bearing portion mounted on a wheel-side end portion of the intermediate shaft; and a wheel-side cup oscillatably housing the bearing portion, and wherein the bearing portion extending substantially parallel to the lower arm and mounted on the vehicle-body-side end portion of the intermediate shaft is disposed to be positioned substantially on a vertical line passing through a vehicle-body-side connection portion of the lower arm.

Preferably, as defined in claim 2, the vehicle-body-side cup is disposed on a connection portion passing line which connects a first connection portion provided in the vehicle body frame and connected to an upper end of the strut damper and a second connection portion provided in the vehicle body frame and connected to a vehicle-body-side end portion of the lower arm.

Desirably, as defined in claim 3, the vehicle-body-side cup and the second connection portion disposed below the vehicle-body-side cup are interrelated such that at least a part of the second connection portion overlaps with a length of the vehicle-body-side cup in the width direction of the vehicle.

Preferably, as defined in claim 4, a third connection portion connecting the knuckle supporting member to the lower arm is provided to be closer to a vehicle width center than a fourth connection portion connecting a lower part of the knuckle to a lower part of the knuckle supporting member.

Desirably, as defined in claim 5, the vehicle body frame has a front part which is comprised of: a lower frame portion extending longitudinally of the vehicle; a plate-shaped bracket extending from the lower frame portion toward the front of the vehicle; and an upper pipe portion extending upward from the plate-shaped bracket, the final reduction gear is disposed on the plate-shaped bracket, and the second connection portion is provided before and after the plate-shaped bracket in such a manner as to sandwich the vehicle-body-side cup provided to the final reduction gear.

Advantageous Effects of Invention

In the invention according to claim 1, a constant velocity ball joint is disposed substantially parallel with the lower arm. The bearing portion mounted on the vehicle-body-side end portion of the intermediate shaft is disposed to be positioned substantially on a vertical line passing through a vehicle-body-side connection portion of the lower arm in a front view of the vehicle.

Since the constant velocity ball joint is disposed substantially parallel with the lower arm, the amount of axial movement of the bearing portion mounted on the vehicle-body-side end portion becomes very small. That is, the amount of axial movement required for the drive shaft is very small. Therefore, it is possible to reduce the size of the vehicle-body-side cup, and thus it is possible to reduce the cost of the constant velocity ball joint.

In the invention according to claim 2, the vehicle-body-side cup is disposed on the connection portion passing line which connects a first connection portion provided in the vehicle body frame and connected to an upper end of the strut damper and a second connection portion provided in the vehicle body frame and connected to a vehicle-body-side end portion of the lower arm. The amount of axial movement (the width direction of the vehicle) of the vehicle-body-side cup becomes very small. That is, the amount of axial movement required for the drive shaft is very small. Therefore, it is possible to reduce the size of the vehicle-body-side cup, and thus it is possible to reduce the cost of the constant velocity ball joint.

In the invention according to claim 3, in the vehicle-body-side cup and the second connection portion disposed below the vehicle-body-side cup, at least a part of the second connection portion overlaps within the length of the vehicle-body-side cup in the width direction of the vehicle in the planar view of the vehicle. If the second connection portion is disposed on the vehicle width outside from the vehicle-body-side cup, the second connection portion should be separated from the constant velocity ball joint so as not to abut on the intermediate shaft moving up and down. In this point, since the second connection portion and the vehicle-body-side cup are overlapped with each other in the present invention, it is possible to make the lower arm closer to the intermediate shaft without an apprehension regarding interference.

In the invention according to claim 4, a third connection portion connecting the knuckle supporting member to the lower arm is provided to be closer to a vehicle width center than a fourth connection portion connecting a lower part of the knuckle to a lower part of the knuckle supporting member. It is possible to raise the third connection portion up without interference with the fourth connection portion. As a result, it is possible to make the lower arm closer to the intermediate shaft.

In the invention according to claim 5, a plate-shaped bracket extends from the lower arm toward the front of the vehicle, and a final reduction gear is disposed on the plate-shaped bracket. When the lower arm is a pipe, the mount position of the final reduction gear rises and thus the vehicle-body-side cup provided to the final reduction gear is disposed at a high position. In this point, in the present invention, the final reduction gear is disposed on the plate-shaped bracket. The plate-shaped bracket has a height dimension smaller than a pipe, and thus it is possible to dispose the vehicle-body-side cup at a low position.

DESCRIPTION OF EMBODIMENTS

Certain preferred embodiments of the present invention will be described below, by way of example only, with reference to the accompanying drawings.

Figure 1:
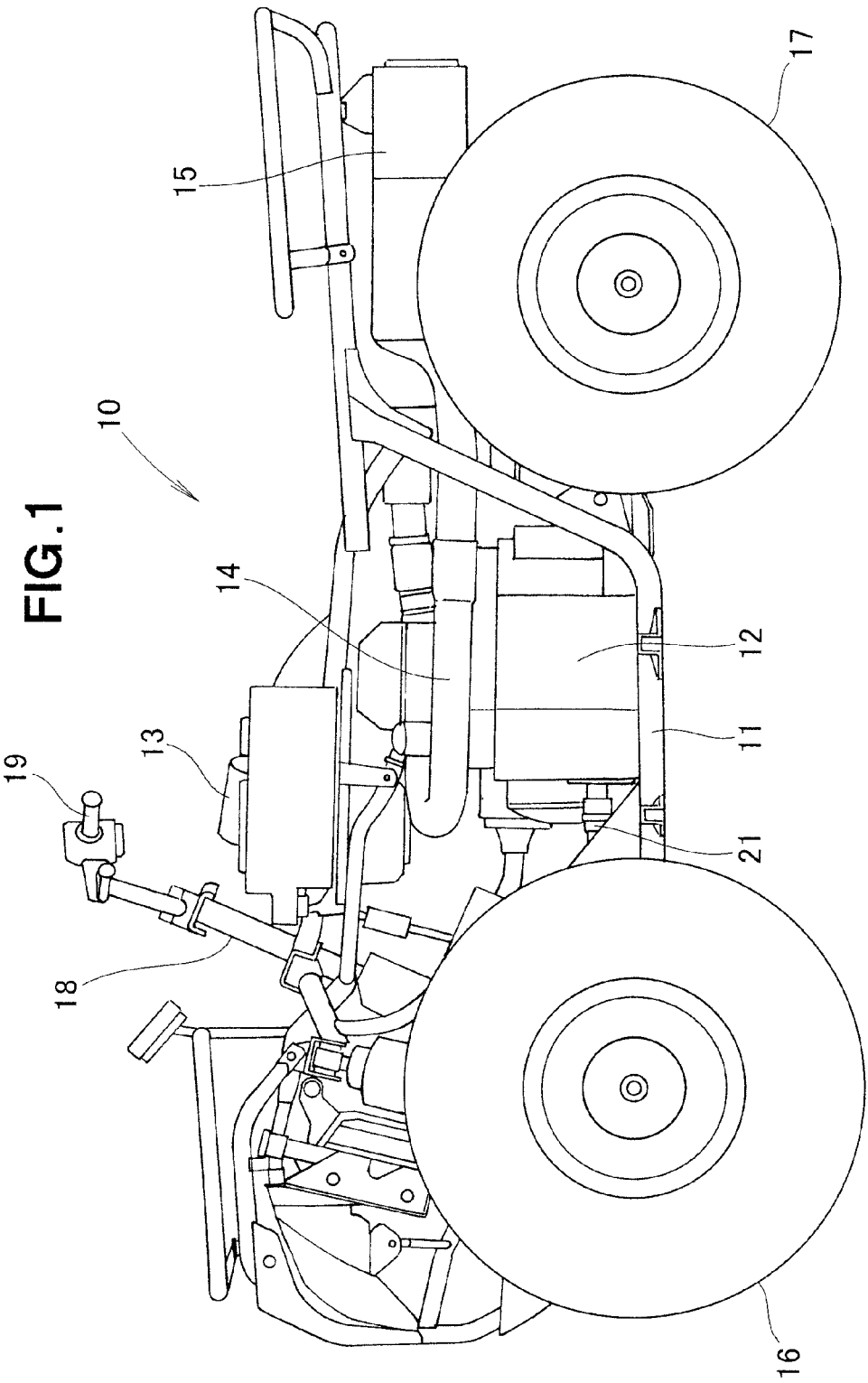
FIG. 1 is a left side elevational view of a vehicle according to the present invention.

As shown in FIG. 1, a vehicle 10 is a small vehicle which includes a power generating engine 12 such as a gasoline engine at the center of a vehicle body frame 11, and is capable of running by mixing fuel with air sucked by an air cleaner 13 provided on the vehicle body frame 11, burning the mixture at the power generating engine 12, discharging exhaust fumes to the outside through an exhaust pipe 14 extending from the power generating engine 12 and a muffler 15 connected to a rear end of the exhaust pipe 14, and transmitting the obtained power to front wheels 16 rotatably mounted below the front side of the vehicle body frame 11 and/or rear wheels 17 rotatably mounted below the rear side of the vehicle body frame 11, and being steered by a steering shaft 18 rotatably mounted on the front side of the vehicle body frame 11 and a steering wheel 19 for rotating the steering shaft 18.

The power generating engine 12 may be any kind of driving source such as a gasoline engine, a diesel engine, an electric motor, etc.

When the front wheels 16 and the rear wheels 17 are wide specific low-pressure tires referred to as balloon tires, since the low-pressure tires can be deformed to absorb the unevenness of a road surface and it is possible to suppress sinking with the wide tires even when the road surface is soft, the vehicle 10 is referred to as an all-terrain vehicle.

Figure 2:
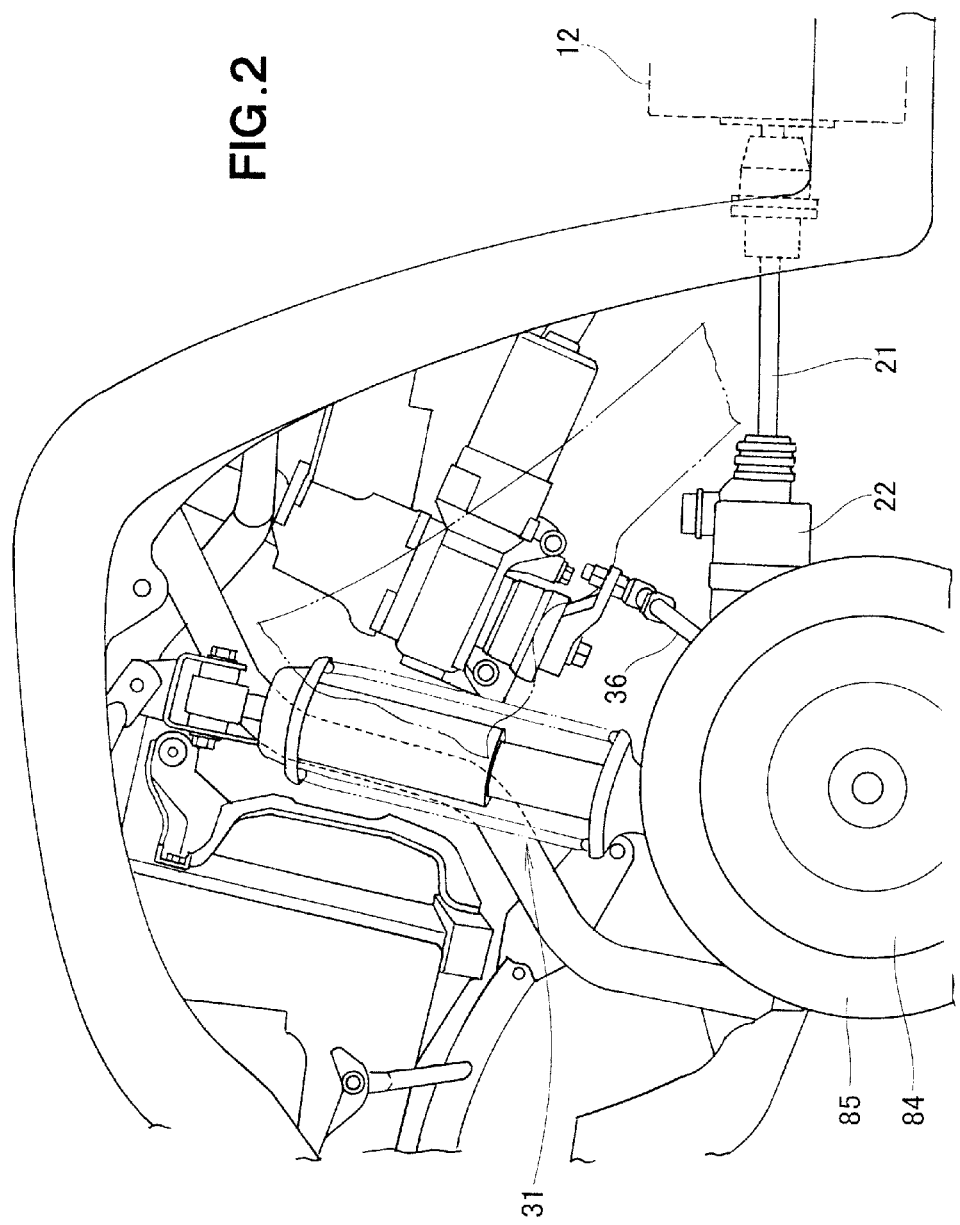
FIG. 2 is a schematic view illustrating a wheel suspension device of the vehicle.

Further, the power generated by the power generating engine 12 is transmitted to a final reduction gear 22 by a power transmission device 21 such as a propeller shaft, etc., as shown in FIG. 2. Then, as shown in FIG. 3, the power is transmitted to the front wheels 16 through a drive shaft 23 extending from the final reduction gear 22 in the width direction of the vehicle such that the front wheels 16 are driven to rotate.

Figure 3:
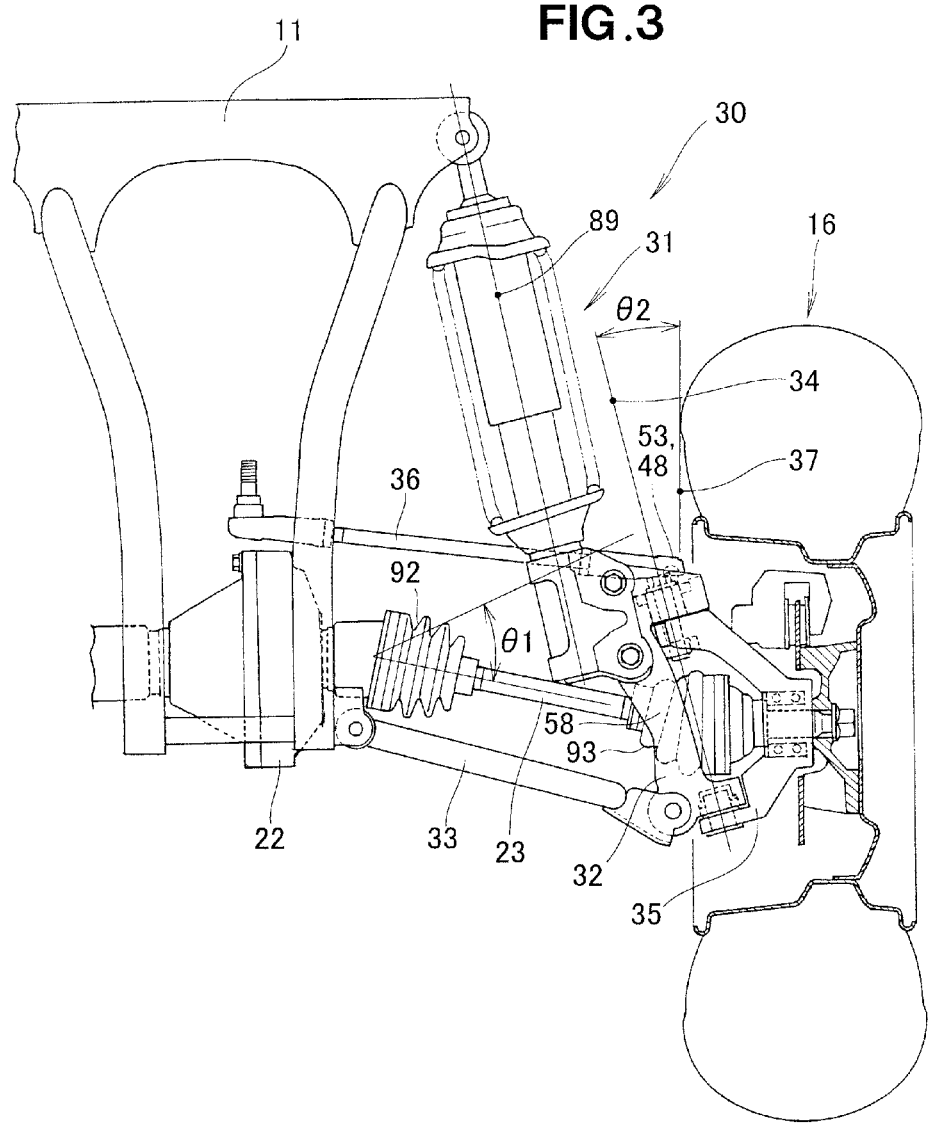
FIG. 3 is a front elevational view of the wheel suspension device.

As shown in FIG. 3, a wheel suspension device 30 includes: a strut damper 31 extending downward with an upper end connected to the vehicle body frame 11; a knuckle supporting member 32 extending downward from the lower part of the strut damper 31; a lower arm 33 extending in the width direction of the vehicle to connect the lower side of the knuckle supporting member 32 to the vehicle body frame 11; a knuckle 35 mounted on the knuckle supporting member 32 to be rotatable around a kingpin axis 34 and supporting the front wheel 16; and a tie rod 36 extending in the width direction of the vehicle and rotating the knuckle 35 around the kingpin axis 34. Hereinafter, the individual constituent components will be described in detail.

Then, according to the up and down movement of the front wheels 16, the drive shaft 23 swings up and down within a swing range θ1. Also, a spherical joint 53 (which will be described in detail) is mounted at the fore end of the tie rod 36, and the spherical joint 53 is connected to a tie rod supporting portion 48 (which will be described in detail) extending from the knuckle 35 toward the front and back sides of the drawing (toward the front and rear sides of the vehicle). The tie rod supporting portion 48 is installed in a region θ2 put in between a survey line 37 passing through the inside surfaces of the front wheels 16 and the kingpin axis 34.

Figure 4:
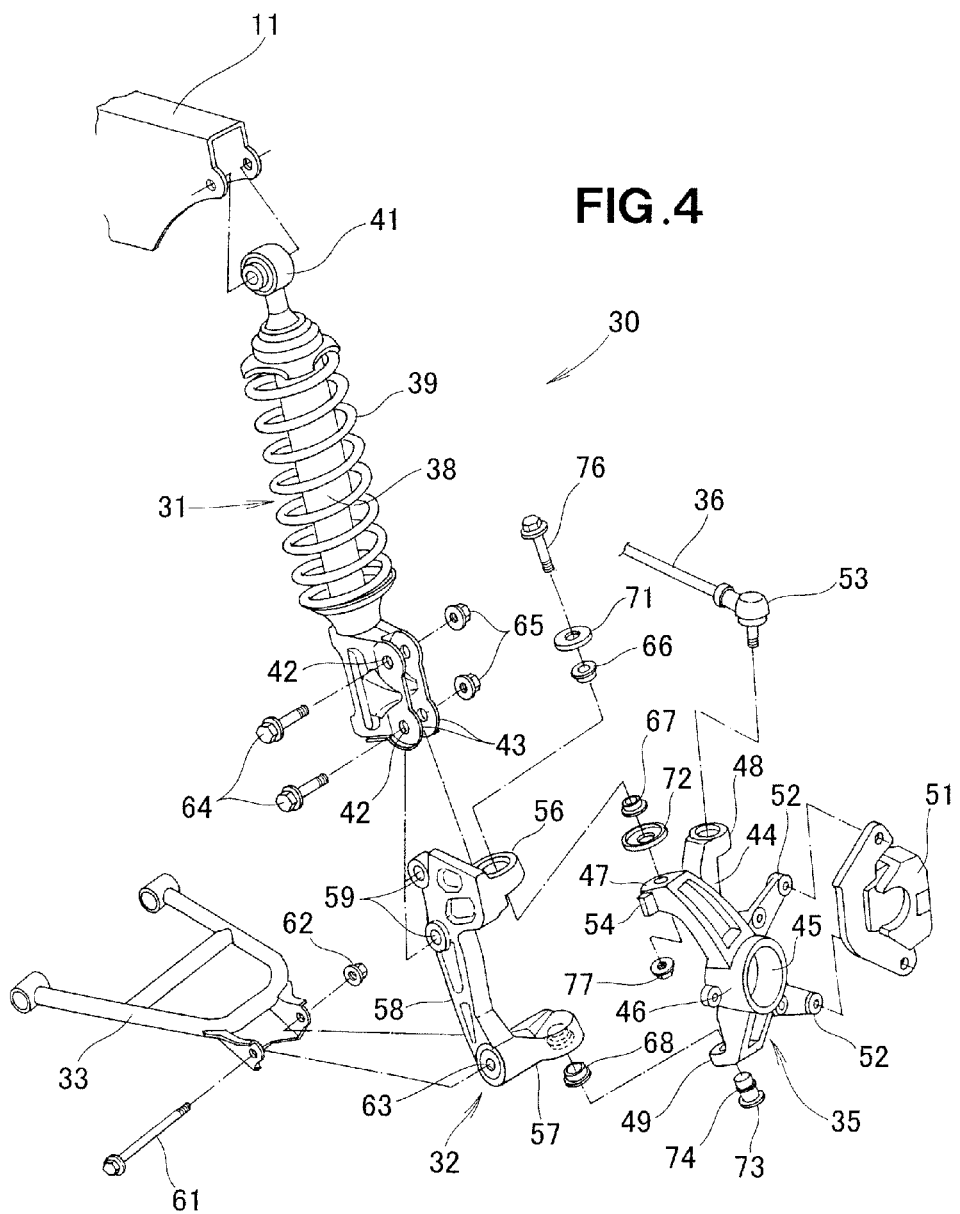
FIG. 4 is an exploded perspective view of the wheel suspension device.

As shown in FIG. 4, the strut damper 31 includes a damper portion 38 damping an impulsive force, and a spring 39 installed to surround the damper portion 38 and bring the shrunken damper portion 38 back to its original length, and an upper end portion 41 of the damper portion 38 is connected to the vehicle body frame 11 to be removable. Further, vertically long connection portions 43, 43 with a plurality of (two in this embodiment) bolt holes 42, 42 are provided on the lower side of the damper portion 38.

The knuckle 35 is a one-piece component in which, from a boss portion 46 having a central hole 45, an upper arm 47 and an extension portion 44 extends upward, a lower arm 49 extends downward, and caliper supporting portions 52, 52 supporting a brake caliper 51 in a transverse direction extend.

The extension portion 44 extends in the front and back sides of the vehicle, and has the tie rod supporting portion 48. The spherical joint 53 of the fore end of the tie rod 36 is connected to the tie rod supporting portion 48. Further, a stopper piece 54 extends from the upper arm 47 toward the front side of the vehicle. The operation of the stopper piece 54 will be described below.

The lower arm 33 is, for example, a pipe component having an "A" shape in a planar view. The knuckle supporting member 32 is a U-shaped member which includes an upper shaft supporting portion 56 supporting the upper part (the upper arm 47) of the knuckle 35, a lower shaft supporting portion 57 supporting the lower part (the lower arm 49) of the knuckle 35, and a bridge portion 58 connecting the upper shaft supporting portion 56 and the lower shaft supporting portion 57. In the upper part of the bridge portion 58, bolt holes 59, 59 passing through the front and rear sides of the vehicle are provided, and in the lower part of the bridge portion 58, a bolt hole 63 to be connected to the lower arm 33 by a bolt 61 and a nut 62 is provided.

It is possible to connect the upper part of the knuckle supporting member 32 to the lower part of the damper portion 38 by interposing the upper part of the knuckle supporting member 32 between the connection portions 43, 43 of the lower part of the damper portion 38, inserting bolts 64, 64 into the bolt holes 42, 42 and the bolt holes 59, 59, and fastening the bolts with nuts 65, 65.

Figure 5:
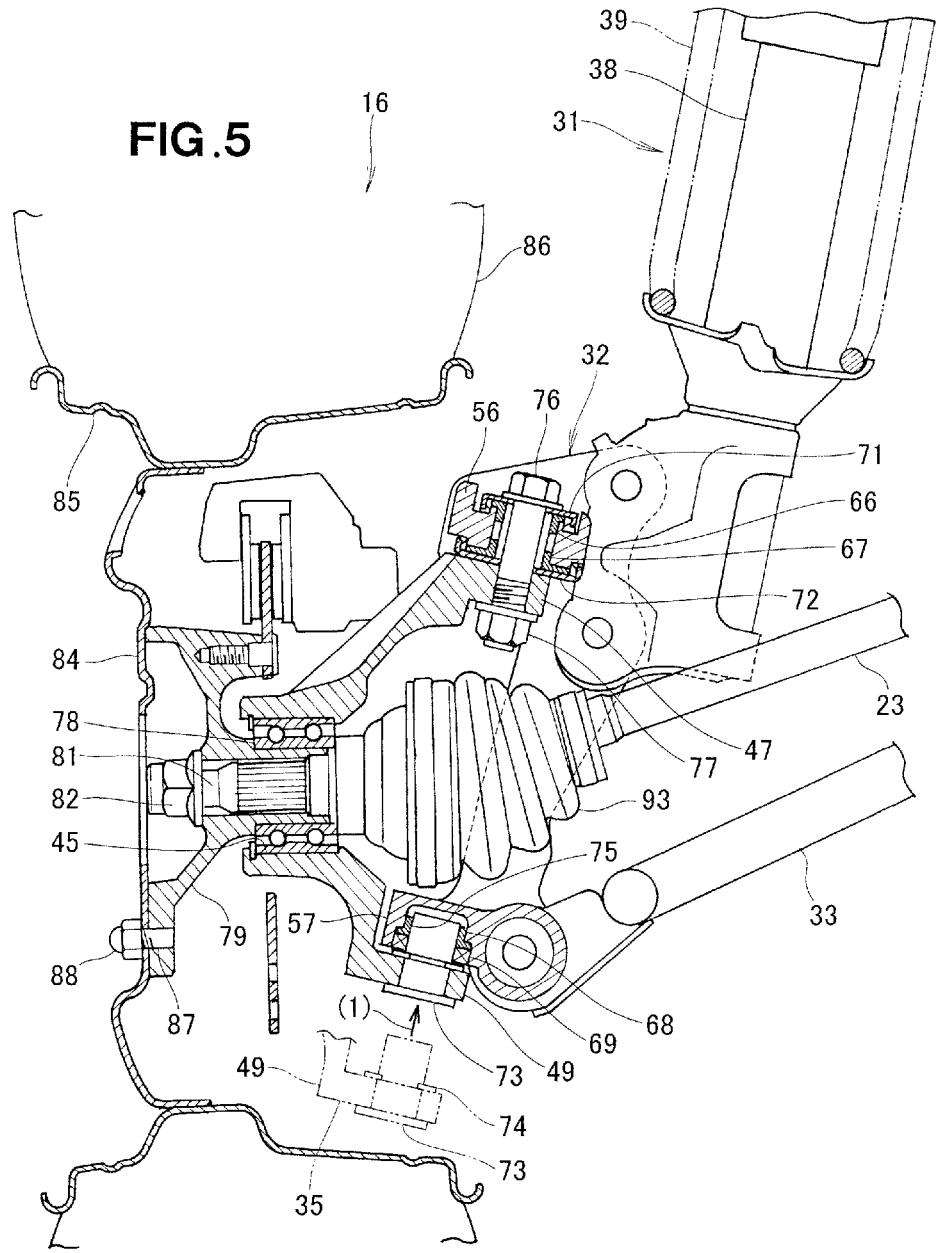
FIG. 5 is a rear elevational view of the wheel suspension device.

The connection of the knuckle supporting member 32 and the knuckle 35 will be described on the basis of FIG. 5 (which is a cross-sectional view of main components as seen from the rear side of the vehicle). As shown in FIG. 5, in the upper shaft supporting portion 56, bushes 66 and 67 having L-shaped cross sections are mounted, and in the lower shaft supporting portion 57, a bush 68 having an L-shaped cross section is mounted and a seal member 69 is mounted. And, a presser lid 71 with a sealing material is mounted on the bush 66 from above, and a presser lid 72 with a sealing material is mounted on the bush 67 from below.

Until this time, the drive shaft 23 is not mounted on the knuckle 35. A dowel 73 having a pin shape with a head is inserted into the lower arm 49 of the knuckle 35 shown by a imaginary line from below upward, and a retaining ring 74 is put on the middle of the dowel 73. Thus, an apprehension that the dowel 73 will fall off the lower arm 49 is removed. And, as an arrow (1), the knuckle supporting member 32 is wholly raised up, whereby the dowel 73 is inserted into a dowel hole 75 of the lower shaft supporting portion 57 and the upper arm 47 abuts on the upper shaft supporting portion 56 from below.

A bolt 76 is inserted into the bushes 66 and 67 having the L-shaped cross sections from above, and the upper arm 47 is inserted. Then, the bolt 76 is fastened with a nut 77.

A bearing 78 is fit into the central hole 45 of the knuckle 35, a hub member 79 is fit into the bearing 78, a shaft end portion 81 of the drive shaft 23 is inserted into the hub member 79, and a nut 82 is mounted on the shaft end portion 81. In this way, the hub member 79 can be rotatably supported by the knuckle 35.

The front wheel 16 includes a spoke portion 84, a rim portion 85 fixed to the outer circumference of the spoke portion 84, and a tire 86 mounted on the rim portion 85. A bolt 87 extends from the hub member 79 toward the outside in the width direction of the vehicle. The front wheel 16 can be mounted on the hub member 79 by mounting the hub member 79 on the bolt 87 and fastening a nut 88.

Next, applicability of the inexpensive drive shaft 23 will be described with reference to the drawings.

Figure 6:
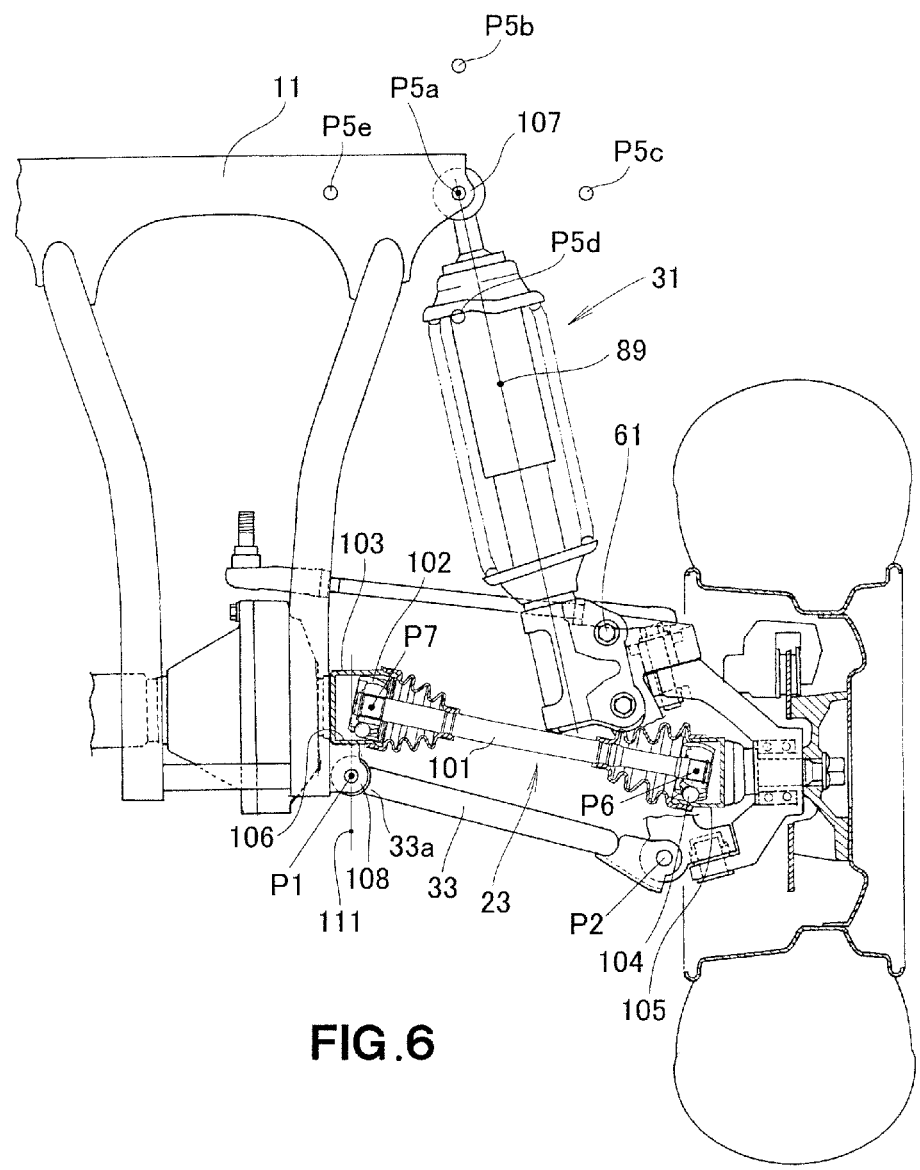
FIG. 6 is a side elevational view of the wheel suspension device.

As shown in FIG. 6, the drive shaft 23 is disposed substantially parallel with the lower arm 33 as a constant velocity ball joint including an intermediate shaft 101, a bearing portion 102 mounted on a vehicle-body-side end portion of the intermediate shaft 101, a vehicle-body-side cup 103 housing the bearing portion 102 to be capable of oscillating, a bearing portion 104 mounted on a wheel-side end portion of the intermediate shaft 101, and a wheel-side cup 105 housing the bearing portion 104 to be capable of oscillating. The vehicle-body-side cup 103 corresponds to the sliding type constant velocity universal joint described in "Background Art" and a groove 106 for sliding is provided.

And, the intermediate shaft 101 is disposed substantially parallel with the lower arm 33. Further, the bearing portion 102 mounted on the vehicle-body-side end portion of the intermediate shaft 101 is disposed to be positioned substantially on a vertical line 111 passing through a vehicle-body-side connection portion 33a of the lower arm 33 in a front view of the vehicle.

Why this layout is advantageous will be described in detail.

In the vehicle body frame 11, a first connection portion 107 to be connected to the upper end of the strut damper 31 is provided. In the drawing, the center of the first connection portion 107 is denoted by P5a. If the configuration of the vehicle body frame 11 is changed, the position of the center P5a is necessarily changed as P5b, P5c, P5d, or P5e. It is an advantage of the present invention that, even when the position of the first connection portion 107 is changed, an amount of movement of the bearing portion 102 in the width direction of the vehicle is small.

Figure 7:
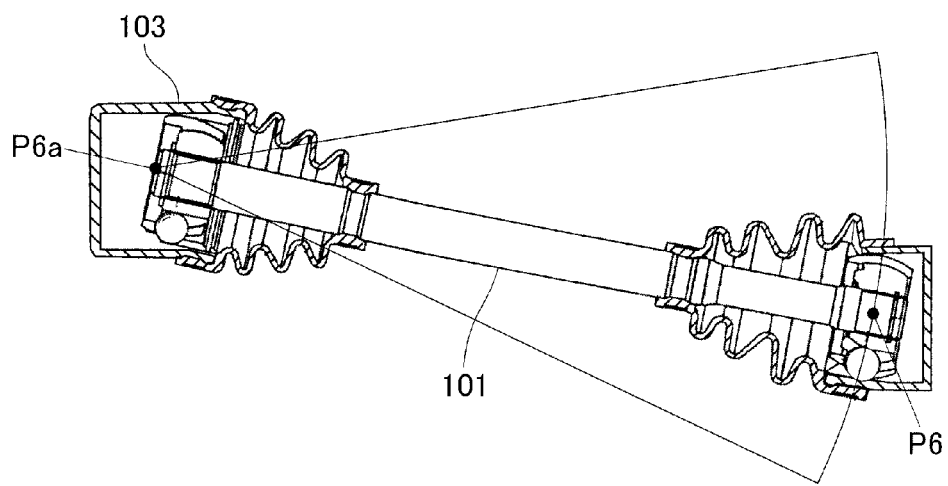
FIG. 7 is a view illustrating an operation of the sheel suspension device shown in FIG. 6.

A vehicle-body-side swing center of the lower arm 33 is denoted by P1, a wheel-side pivot point of the lower arm 33 is denoted by P2, and the central point of the bearing portion 104 mounted on the wheel-side end portion of the intermediate shaft 101 is denoted by P6. If the strut damper 31 extends and contracts, the lower arm 33 rotates on P1 upward such that P2 moves in a circular arc. During the movement of P2, P6 also moves while drawing a circular arc. The trajectory of P6 is shown in FIG. 7. The central point P6a of the drawn circular arc is geometrically unambiguously determined.

Although omitted in the drawing, even when the point P5a of FIG. 6 moves to upper P5b, a figure as FIG. 7 can be drawn. In this case, the central point of the circular arc is denoted by P6b. Similarly, even when the point P5a of FIG. 6 moves to P5c, a figure as FIG. 7 can be drawn, and in this case, the central point of the circular arc is denoted by P6c, even when the point P5a of FIG. 6 moves to P5d, a figure as FIG. 7 can be drawn, and in this case, the central point of the circular arc is denoted by P6d, and even when the point P5a of FIG. 6 moves to upper P5e, a figure as FIG. 7 can be drawn, and in this case, the central point of the circular arc is denoted by P6e.

Figure 8:
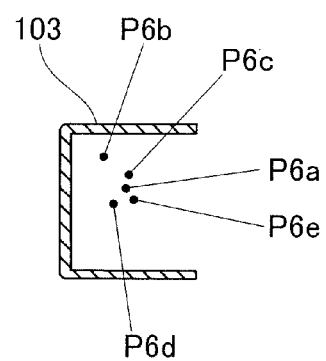
FIG. 8 is a view illustrating the operation of FIG. 7 in more detail.

It can be seen that, as shown in FIG. 8, those points P6a to P6e are distributed in a vehicle-body-side cup 103 in the front view of the vehicle. The distribution is relatively concentrated. It becomes clear from FIG. 6 that even when the position of the first connection portion 107 is changed, it is unnecessary to enlarge the vehicle-body-side cup 103. That is, according to the present invention, it is possible to reduce the vehicle-body-side cup 103.

In the above-mentioned configuration, the bearing portion 102 is disposed to be positioned substantially on the vertical line 111 passing through the vehicle-body-side connection portion 33a of the lower arm 33 in the front elevation view of the vehicle; however, it is preferable to dispose the vehicle-body-side cup 103 at a position regarding the first connection portion 107 and a second connection portion to be described below.

Figure 9:
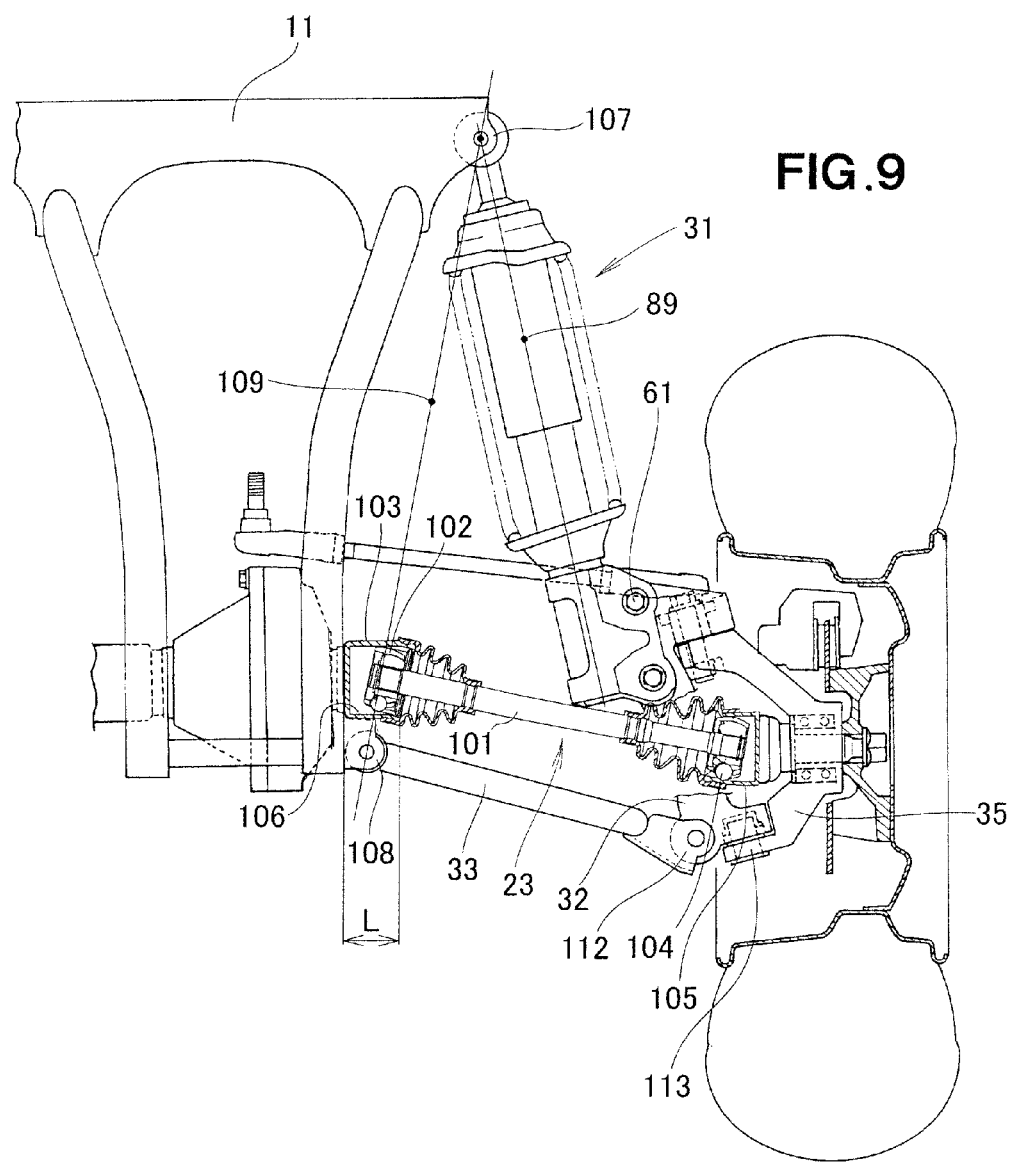
FIG. 9 is a view illustrating the operation differently from FIG. 7.

As shown in FIG. 9, in the vehicle body frame 11, the first connection portion 107 to be connected to the upper end of the strut damper 31 and the second connection portion 108 to be connected to the vehicle-body-side end portion of the lower arm 33 are provided, and a line connecting the connection portions 107 and 108 is referred to as a connection portion passing line 109. In the present invention, on the connection portion passing line 109, the vehicle-body-side cup 103 is disposed. By using this configuration, it is possible to make an amount of axial movement (an amount of movement in the width direction of the vehicle) of the bearing portion 102 be almost 0, and it possible to reduce the length of the groove 106. Therefore, it is possible to reduce the size of the vehicle-body-side cup 103.

Further, in the vehicle-body-side cup 103 and the second connection portion 108 disposed below the vehicle-body-side cup 103, if the length of the vehicle-body-side cup 103 in the width direction of the vehicle is denoted by L, the second connection portion 108 is disposed in the length L. In other words, in the planar view of the vehicle, the front part or at least a part of the second connection portion 108 overlaps within the length of the vehicle-body-side cup 103 in the width direction of the vehicle.

If the second connection portion 108 is disposed on the vehicle width outside from the vehicle-body-side cup 103, the second connection portion 108 should be separated from the constant velocity ball joint so as not to abut on the intermediate shaft 101 moving up and down. In this point, since the second connection portion 108 and the vehicle-body-side cup 103 are overlapped with each other in this embodiment, it is possible to make the lower arm 33 closer to the intermediate shaft 101 without an apprehension regarding interference.

Also, a part in which the knuckle supporting member 32 is connected to the lower arm 33 is referred to as a third connection portion 112, and a part in which the lower part of the knuckle 35 is connected to the lower part of the knuckle supporting member 32 is referred to as a fourth connection portion 113. The third connection portion 112 is disposed closer to the center of the vehicle width than the fourth connection portion 113. It is possible to raise the third connection portion 112 up without interfering the fourth connection portion 113. As a result, it is possible to make the lower arm 33 closer to the intermediate shaft 101.

Next, a configuration in which the final reduction gear (denoted by reference numeral 22 in FIG. 2) is disposed on the vehicle body frame 11 will be described.

Figure 10:
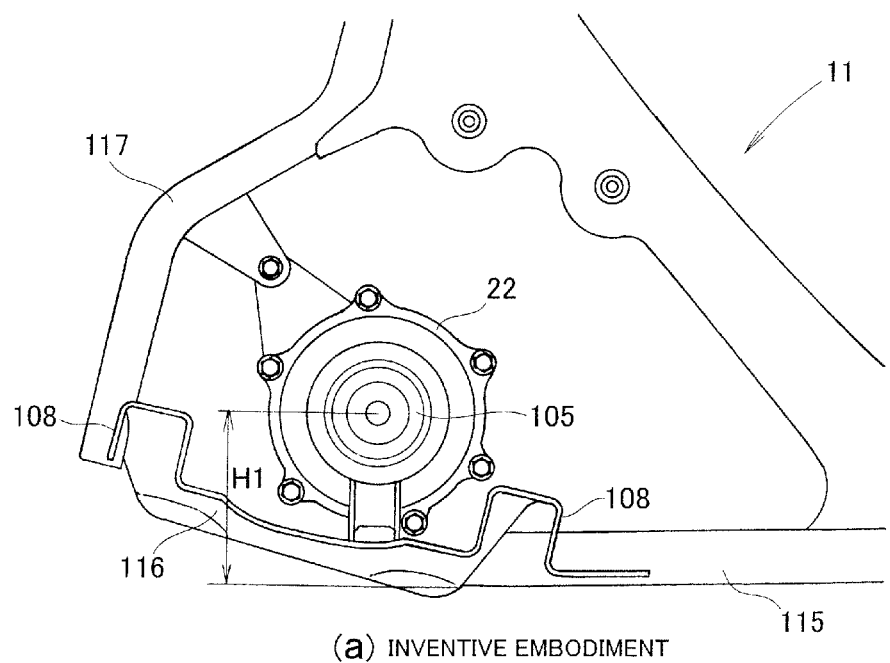
FIG. 10 is a view illustrating a layout of a final reduction gear.
Figure 10:
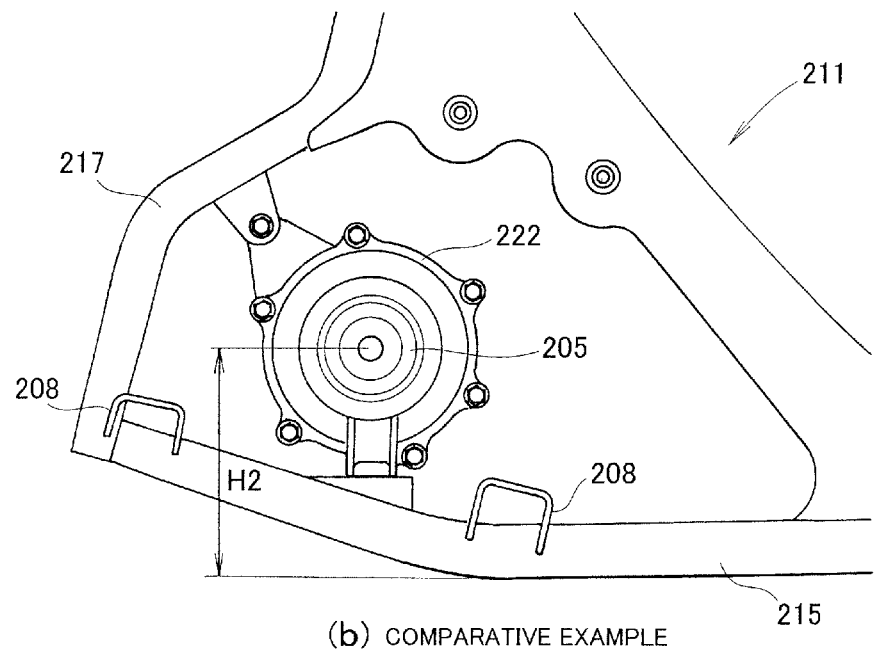

(a) of FIG. 10 shows details of the vehicle body frame 11 of the present invention, and (b) of FIG. 10 shows a vehicle body frame 211 in a comparative example.

As shown in FIG. 10 (a), the front part of the vehicle body frame 11 includes a lower frame portion 115 extending in the longitudinal direction of the vehicle, a plate-shaped bracket 116 extending from the lower frame portion 115 toward the front of the vehicle, and an upper pipe portion 117 extending from the plate-shaped bracket 116 upward. The final reduction gear 22 is disposed on the plate-shaped bracket 116, and a pair of second connection portions 108 and 108 are provided before and after the plate-shaped bracket 116 so as to hold the vehicle-body-side cup 105 provided to the final reduction gear 22 as viewed sideways of the vehicle.

Since the plate-shaped bracket 116 is used, it is possible to sufficiently lower a gap between the pair of second connection portions 108 and 108 and mount the final reduction gear 22 in the gap. The height from the bottom surface of the lower frame portion 115 to the center of the vehicle-body-side cup 105 is denoted by H1.

Meanwhile, in the comparative example, as shown in (b), the front part of a vehicle body frame 211 includes a lower frame portion 215 extending in the longitudinal direction of the vehicle, and an upper pipe portion 217 extending from the lower frame portion 215 upward. The lower frame portion 215 is also a pipe. A final reduction gear 222 is disposed on the lower frame portion 215, and a pair of second connection portions 208 and 208 are provided on the lower frame portion 215 so as to hold the vehicle-body-side cup 205 provided to the final reduction gear 222 as viewed sideways of the vehicle.

The height from the bottom surface of the lower frame portion 215 to the center of the vehicle-body-side cup 205 is denoted by H2. The height H1 shown in FIG. 10(a) is dramatically smaller than the height H2 shown in FIG. 10(b). In the configuration shown in FIG. 10(a), it is possible to dispose the vehicle-body-side cup 105 at a lower position, as compared to the configuration shown in FIG. 10(b). If it is possible to dispose the vehicle-body-side cup 105 at a low position, advantages in manufacturing, such as an advantage in which it is possible to easily lower the center, are obtained.

Industrial Applicability

The suspension device according to the present invention is particularly suitable for use on an all-terrain vehicle.

REFERENCE SIGNS LIST

10 . . . VEHICLE (ALL-TERRAIN VEHICLE)
11 . . . VEHICLE BODY FRAME
12 . . . POWER GENERATING ENGINE
16 . . . WHEEL (FRONT WHEEL)
21 . . . POWER TRANSMISSION DEVICE
22 . . . FINAL POWER DECELERATION DEVICE
23 . . . DRIVE SHAFT
30 . . . WHEEL SUSPENSION DEVICE
31 . . . STRUT DAMPER
32 . . . KNUCKLE SUPPORTING MEMBER
33 . . . LOWER ARM
34 . . . KINGPIN AXIS
101 . . . INTERMEDIATE SHAFT
102, 104 . . . BEARING PART
103 . . . VEHICLE-BODY-SIDE CUP
105 . . . WHEEL-SIDE CUP
106 . . . GROOVE
107 . . . FIRST CONNECTION PART
108 . . . SECOND CONNECTION PART
109 . . . CONNECTION PART PASSING LINE

The invention claimed is:
1. An all-terrain vehicle comprising:
a vehicle body frame;
a power generating engine, mounted on the vehicle body frame, for generating power;
a power transmission device for transmitting an output generated by the power generating engine;

a final reduction gear, mounted on the vehicle body frame, for decelerating the power transmitted by the power transmission device;

a drive shaft, extending in a direction of width of the vehicle, for transmitting the power from the final reduction gear to a wheel; and a wheel suspension device including
  a strut damper having an upper end connected to the vehicle body frame and extending downward;
  a knuckle supporting member having an upper end connected to a lower end of the strut damper and extending downward;
  a lower arm extending in the direction of width of the vehicle and connecting a lower part of the knuckle supporting member to the vehicle body frame;
  a knuckle, mounted on the knuckle supporting member in such a manner as to be rotatable around a kingpin axis, for supporting a front wheel, the knuckle being supported on the upper end and a lower end of the knuckle supporting member; and
  a tie rod extending in the width direction of the vehicle and supported on an upper part of the knuckle for rotating the knuckle, wherein the drive shaft comprises a constant velocity ball joint extending substantially parallel with the lower arm and including: an intermediate shaft; a vehicle-body-side bearing portion mounted on a vehicle-body-side end portion of the intermediate shaft; a vehicle-body-side cup oscillatably housing the vehicle-body-side bearing portion; a wheel-side bearing portion mounted on a wheel-side end portion of the intermediate shaft; and a wheel-side cup oscillatably housing the wheel-side bearing portion, wherein the vehicle-body-side bearing portion mounted on the vehicle-body-side end portion of the intermediate shaft is located substantially on a vertical line extending in a longitudinal direction of the vehicle and passing through a vehicle-body-side connection portion of the lower arm in a front view of the vehicle, wherein the vehicle-body-side cup is disposed on a connection portion passing plane which extends in the longitudinal direction of the vehicle and connects a first connection portion provided in the vehicle boy frame and connected to the upper end of the strut damper and a second connection portion provided in the vehicle body frame and connected to a vehicle-body-side end portion of the lower arm, wherein a third connection portion connecting the knuckle supporting member to the lower arm is provided to be closer to a vehicle width center than a fourth connection portion connecting a lower part of the knuckle to the lower part of the knuckle supporting member, wherein the kingpin axis and an axis of the strut damper tilt in the same direction such that upper sides of the axes come close to the vehicle width center in the front view of the vehicle, wherein the vehicle-body-side cup and the second connection portion disposed below the vehicle-body-side cup are interrelated such that at least a part of the second connection portion overlaps with a length of the vehicle-body-side cup in the width direction of the vehicle, wherein the vehicle body frame has a front part which is comprised of: a lower frame portion extending longitudinally of the vehicle; a plate-shaped bracket extending from the lower frame portion toward the front of the vehicle; and an upper pipe portion extending upward from the plate-shaped bracket, wherein the second connection portion comprises a pair of second connection portions provided at a front end and a rear end, respectively, of the bracket, one of the pair of second connection portions provided at the front end of the bracket is connected to the upper pipe portion, the other of the pair of second connection portions provided at the rear end of the bracket is connected to the lower frame portion, and the bracket has a generally U shape in a side view of the vehicle and includes a downwardly concaved intermediate portion extending between the pair of second connection portions, and wherein the final reduction gear is disposed on the downwardly concaved intermediate portion of the bracket with the vehicle-body-side cup provided to the final reduction gear disposed between the pair of second connection portions.

* * * * *